(12) United States Patent
Bait-Suwailam et al.

(10) Patent No.: US 9,614,396 B1
(45) Date of Patent: Apr. 4, 2017

(54) MULTI-ELEMENT PORTABLE WIRELESS CHARGING DEVICE AND METHOD

(71) Applicant: SULTAN QABOOS UNIVERSITY, Muscat (OM)

(72) Inventors: Mohammed M. Bait-Suwailam, Muscat (OM); Mohammed Nasser Al Kindi, Muscat (OM); Ammar Khamis Al Mahrami, Muscat (OM); Jaafar Abdullah Al Dawood, Muscat (OM); Abdulaziz Mohammed Al Balushi, Muscat (OM)

(73) Assignee: SULTAN QABOOS UNIVERSITY, Muscat (OM)

( * ) Notice: Subject to any disclaimer, the term of this patent is extended or adjusted under 35 U.S.C. 154(b) by 0 days.

(21) Appl. No.: 15/178,458

(22) Filed: Jun. 9, 2016

(51) Int. Cl.
*H02J 7/02* (2016.01)
*H02J 7/00* (2006.01)
*H02J 50/10* (2016.01)
*H02J 50/40* (2016.01)

(52) U.S. Cl.
CPC ............ *H02J 7/025* (2013.01); *H02J 7/0013* (2013.01); *H02J 7/0042* (2013.01); *H02J 50/10* (2016.02); *H02J 50/40* (2016.02)

(58) Field of Classification Search
CPC ..................................... H02J 7/025
USPC .......................................... 320/108
See application file for complete search history.

(56) References Cited

U.S. PATENT DOCUMENTS

| 6,879,809 | B1 | 4/2005 | Vega et al. |
| 8,645,481 | B2 | 2/2014 | Eaton |
| 8,656,080 | B2 | 2/2014 | Shin |
| 8,847,547 | B2 | 9/2014 | Lee et al. |
| 2009/0096413 | A1* | 4/2009 | Partovi ................... H01F 5/003 320/108 |

(Continued)

FOREIGN PATENT DOCUMENTS

| CH | EP 2573900 A1 * | 3/2013 | ............ H02J 7/0054 |
| CN | 102545354 B | 11/2013 | |

(Continued)

OTHER PUBLICATIONS

"RAVPower Qi-Enabled Single-Position Wireless Charger Charging Pad with built-in 4800 mAh Backup Battery—White", Amazon.com, Dec. 2015, 9 pages.

Primary Examiner — Richard Isla Rodas
Assistant Examiner — Manuel Hernandez
(74) Attorney, Agent, or Firm — Richard C. Litman

(57) ABSTRACT

The multi-element portable wireless charging device includes a transmitter having a DC power source (battery), an oscillator connected to the battery for converting the DC to AC, a power amplifier connected to the AC output of the oscillator, and at least one flat, planar primary coil connected as a load of the power amplifier circuit. The system also includes a receiver (typically installed in the device requiring recharging) that has a flat, planar secondary coil in which an AC current is induced when placed in close proximity (1-3 cm) to the primary coil, a full-wave bridge rectifier to rectify the AC current to DC, and a voltage regulator connected to the rectifier to provide a steady DC voltage required by the charging circuit to charge the mobile device. Power is transmitted from the transmitter to the receiver by magnetic inductive coupling.

9 Claims, 12 Drawing Sheets

(56) References Cited

U.S. PATENT DOCUMENTS

| | | | |
|---|---|---|---|
| 2010/0084918 A1* | 4/2010 | Fells | H02J 5/005 307/32 |
| 2011/0050164 A1* | 3/2011 | Partovi | H01F 5/003 320/108 |
| 2012/0235636 A1* | 9/2012 | Partovi | H02J 7/025 320/108 |
| 2012/0242160 A1* | 9/2012 | Tseng | H04B 5/0037 307/104 |
| 2013/0035814 A1 | 2/2013 | Boyer et al. | |

FOREIGN PATENT DOCUMENTS

| | | |
|---|---|---|
| CN | 204258405 U | 4/2015 |
| JP | 6-54454 | 2/1994 |

\* cited by examiner

MULTI-ELEMENT PORTABLE WIRELESS CHARGING DEVICE AND METHOD

BACKGROUND OF THE INVENTION

1. Field of the Invention

The present invention relates to mobile device charging, and particularly to a multi-element portable wireless charging device and method for cell phones, tablets, and the like.

2. Description of the Related Art

Smart electronic devices, including mobile phones, tablets, and the like, provide lots of applications and "power-hungry" features due to the increased demands of mobile phones' users worldwide in providing lots of social media and gaming applications. Such requirements cause tremendous amount of power consumption. Nowadays, companies look for cost-effective solutions to this power consumption constraint. Since these smart devices use rechargeable batteries and are quite often in a mobility mode in which there may not be a power outlet available for recharging the battery in conventional manner, there is a need for a portable charging unit that can accommodate more than one mobile device and method for recharging the battery of the smart electronic device wirelessly, without the need for wires and cables or an AC power mains outlet.

Thus, a multi-element portable wireless charging device and method solving the aforementioned problems are desired.

SUMMARY OF THE INVENTION

The multi-element wireless charging system includes a transmitter having a DC power source (battery), an oscillator connected to the battery for converting the DC to AC, a power amplifier that is connected to the AC output of the oscillator, and multi-flat, planar primary set of coils connected as a load of the power amplifier circuit, which thereafter is used as a transmitter. The system also includes a receiver (typically installed in the mobile device requiring recharging) that has a flat, planar secondary coil in which an oscillating current is induced when placed in close proximity (1-3 cm) to the primary coil, a full-wave bridge rectifier to rectify the AC current to DC, and a voltage regulator connected to the rectifier to provide a steady-state DC voltage required by the charging circuit to charge the mobile device. Power is, thus, transmitted from the transmitter to the receiver via magnetic inductive coupling.

The transmitter preferably operates in the range of 100 kHz-210 kHz with a DC voltage of 9-11 V for efficient power transmission from the transmitter to the receiver, and to comply with the Qi standard for wireless charging devices. The transmitter may contain a PIC microcontroller connected to a BLUETOOTH ® communications circuit that receives a signal from the mobile phone or other device when the device needs to be charged and turns on the wireless communication path, and also turns off the communication path once the device's battery is fully charged. The transmitter may also have a USB port for charging the battery using a USB cable when the battery is so discharged in case that it cannot provide BLUETOOTH ® or other wireless connectivity. The transmitter may have two or more primary coils for simultaneously transmitting power to two receivers in order to simultaneously charge batteries in two mobile phones or other smart device.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
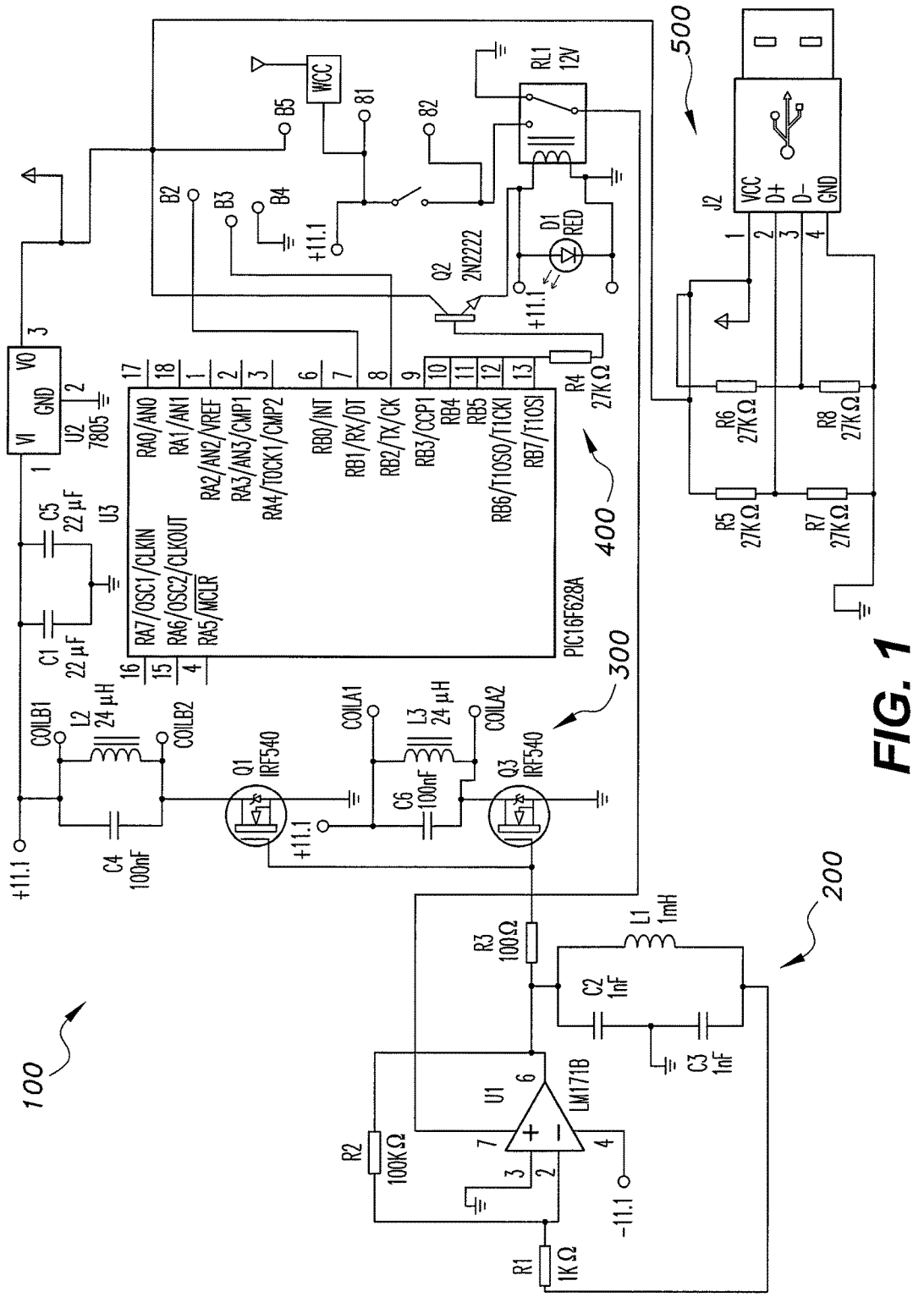
FIG. 1 is a partial schematic diagram of a transmitter in a multi-element portable wireless charging device according to the present invention.
Figure 6:
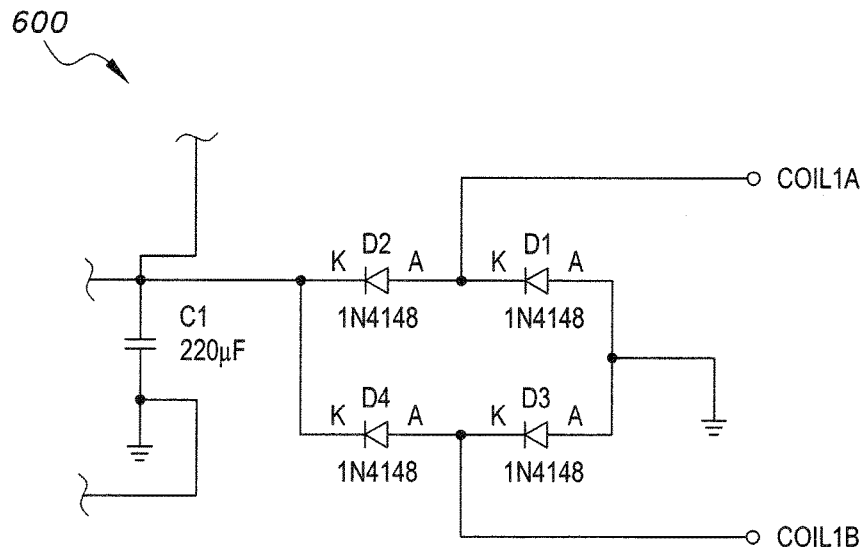
FIG. 6 is a schematic diagram of a full-wave bridge rectifier used in the receiver of the multi-element portable wireless charging device according to the present invention.

The multi-element portable wireless charging device includes a transmitter having a DC power source (battery), an oscillator connected to the battery for converting the DC to AC, a power amplifier connected to the AC output of the oscillator, and a flat, planar primary coil connected as a load of the power amplifier circuit. The system also includes a receiver (typically installed in the device requiring recharging) that has a flat, planar secondary coil in which an AC current is induced when placed in close proximity (1-3 cm) to the primary coil, a full-wave bridge rectifier to rectify the AC current to DC, and a voltage regulator connected to the rectifier to provide a steady-state DC voltage required by the charging circuit for charges the mobile device. Power is transmitted from the transmitter to the receiver by magnetic inductive coupling, The multi-element portable wireless charging device 100 (as shown in FIG. 1) includes an oscillator circuit 200 oscillating at an RF frequency connected as an input to an amplifier circuit 300, and a flat, planar primary coil connected to the output of amplifier circuit 300. RF power is transmitted by magnetic inductive coupling to a secondary coil in a receiver in close proximity to the transmitter's primary coil. The receiver has a full-wave bridge rectifier 600 (shown in FIG. 6) to rectify the induced AC current to DC and a voltage regulator to provide a steady-state DC voltage that charges the battery of a mobile device.

Figure 2:
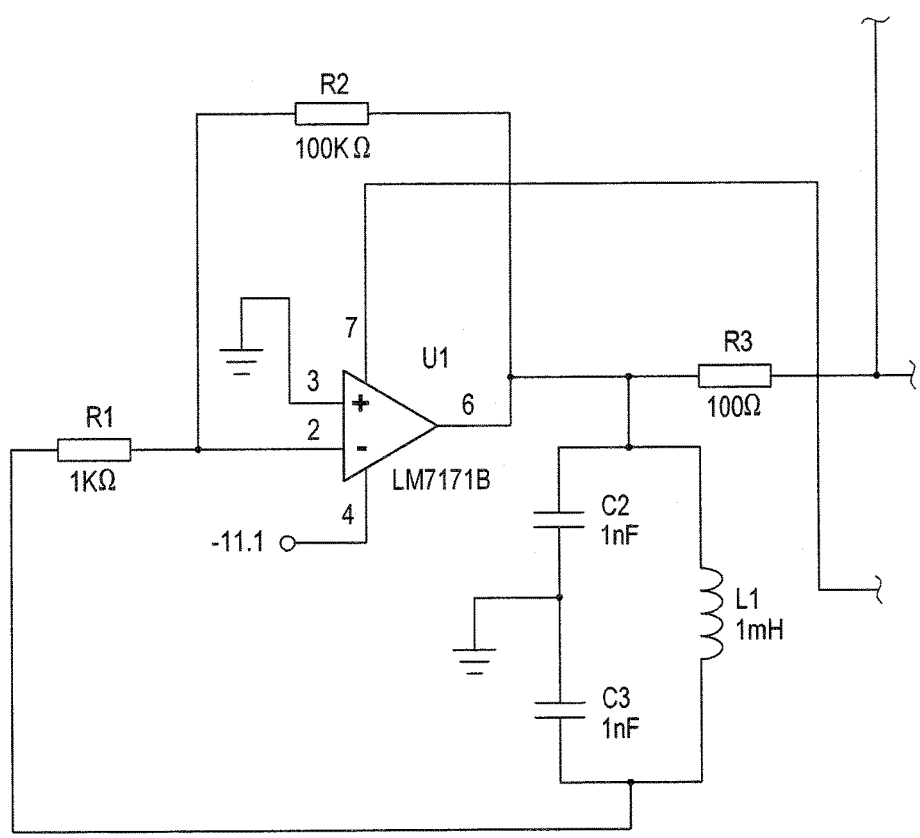
FIG. 2 is a schematic diagram of the oscillator circuit used in the transmitter of FIG. 1.

The oscillator circuit 200 (most clearly shown in FIG. 2) is preferably a Colpitts oscillator design with the coil L1 and capacitors C2 and C3 forming a tank circuit setting the frequency of oscillation. The oscillator circuit 200 is of the type used for a typical operating range between 20 KHz and 300 MHz. The oscillator circuit 200 has many applications, such as generating a high frequency sinusoidal signal. The oscillator circuit 200 includes the tank circuit and an inverting operational amplifier U1. The tank circuit includes capacitors C2 and C3 in series and inductor L1 parallel to the series capacitors C2 and C3, as shown in FIG. 2.

The frequency of oscillation depends on the values of capacitors C2, C3, and the inductor L1. The voltage divider between the two capacitors (C2, C3) in the tank circuit works as a feedback source to the amplifier U1, and better frequency stability is given with such arrangement. The Colpitts oscillator was chosen due to its favorable comparison to other types of oscillators.

The inverting operational amplifier (Op-Amp) U1 is used, where R1 is the input resistor and R2 is the feedback resistor. The gain of the amplifier is individually set using the components R2 and R1.

Figure 3:
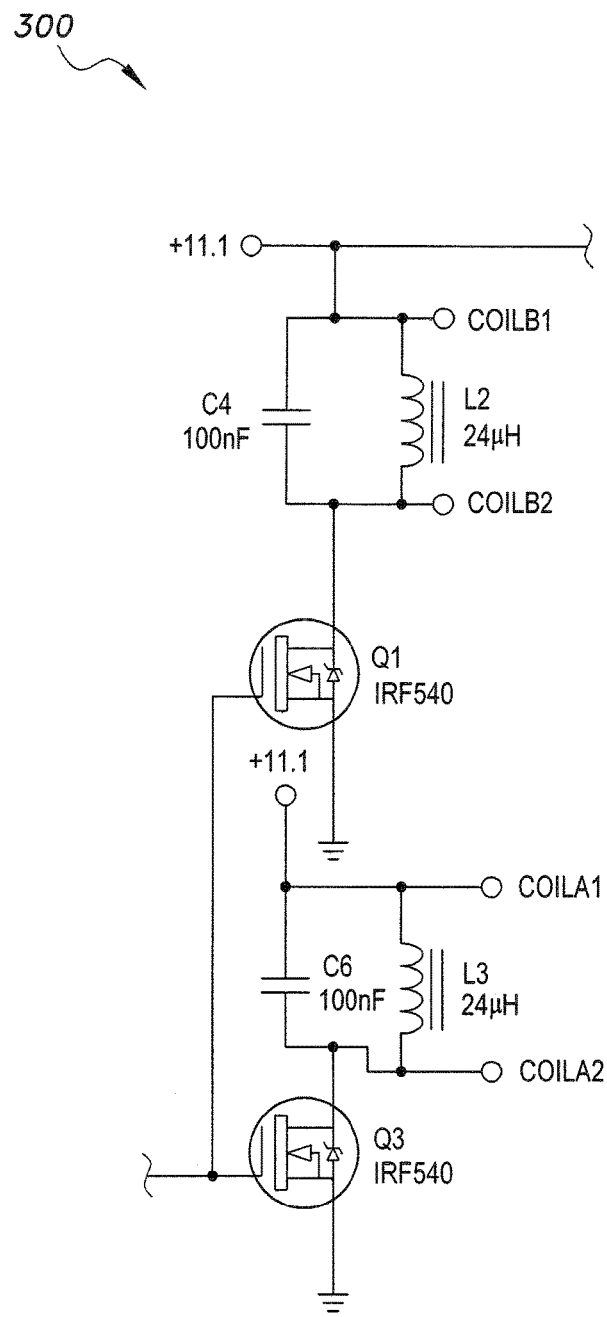
FIG. 3 is a schematic diagram of a two parallel power amplifier circuit used in the transmitter of FIG. 1.

The power generated by the oscillator circuit is not sufficient to transmit a strong magnetic field to the transmitter primary coil at low frequencies. Therefore, a class C power amplifier 300, as shown in FIG. 3, is used to improve the output signal current. The MOSFETs Q1 and Q3 are a part of the Class C power amplifier that conducts for less than one half cycle of the input signal. Two MOSFETs are connected in parallel to amplify the oscillator output for two primary coils connected in parallel to charge two batteries in separate devices simultaneously. The reduced conduction of the class C amplifier configuration will improve the efficiency up to 90% theoretically, due to the high distortion caused by the reduction of conduction. This class is suitable for radio frequency circuits, like radio-frequency oscillators, since there are additional tuned circuits for retrieving the original input signal from the pulsed output of the Class C amplifier 300, so the distortion caused by the amplifier has little effect on the final output. Inductor L2 and capacitor C4 form a tuned circuit (and inductor L3 and capacitor C6 form a second tuned circuit for MOSFET Q3), which provides the output from the Q1 MOSFET as required. Each MOSFET is used to produce a series of current pulses according to the input, these pulses flowing through the resonant tuned circuit. The value of L2 and C4 (an L3 and C6) are selected such that the resonant circuit oscillates within the same frequency range as the input signal from the oscillator.

With respect to the receiver, a full-wave bridge rectifier circuit 600 is used. In the wireless charging circuit, the induced voltage in the secondary coils (receiver) due to the magnetic field is an alternating voltage. However, the output of the receiver must be a DC voltage, so it is required to convert the AC voltage at the receiver to DC voltage. For this purpose, a power electronic device needs to be used (rectifier). For the single phase, there are three types, uncontrolled, half-controlled and fully controlled. For the present system, a full-wave uncontrolled rectifier is used.

Figure 7:
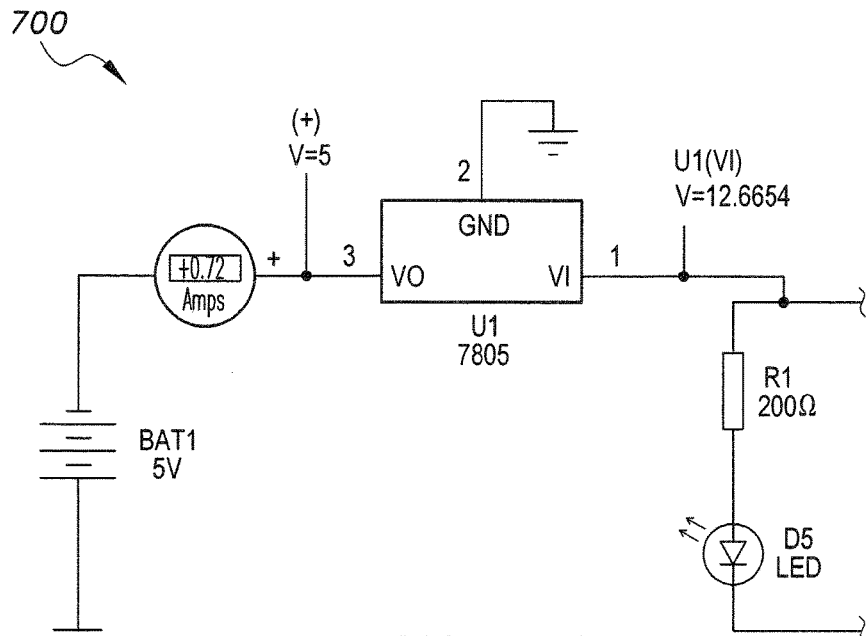
FIG. 7 is a block schematic diagram of the voltage regulator circuit used in the receiver of the multi-element portable wireless charging device according to the present invention.

Voltage regulation is used in the present system. In the receiver, the voltage is converted to DC, but the output voltage must be fixed within 5V and the current must be between 0.5-1 A. Consequently, to get a fixed output means a regulator 700 (shown in FIG. 7) is connected in series after the rectifier 600 and before the output. There are two types of regulators that can be used, in general: the linear regulator and the switching regulator. The linear regulator is preferable and used for this device.

Regarding the processing unit 400 (most clearly shown in FIG. 4), the transmitter will be in a standby mode waiting for devices requesting to connect to charge. The transmitter will start transmitting power as soon as a device is connected wirelessly. When the device is disconnected, the transmitter will stop charging. There were different options to choose for the processing unit, such as Peripheral Interface Controller (PIC), Raspberry Pi, and Arduino UNO. However, the PIC was chosen to be the processing unit in the transmitter, since it is smaller in size, easier to implement, and cheap. On the other hand, neither the Raspberry Pi nor the Arduino UNO was chosen because they are larger, more expensive, harder to implement, and have more functions that are not needed at present system. The PIC microprocessor unit includes software/firmware that provides some of the means for system control, as described in Table 1.

TABLE 1

System Control Steps

| Step | Process |
|---|---|
| 1 | Start |
| 2 | Check for device requiring charging |
| 3 | Activate the oscillator |
| 4 | Amplify the signal |
| 5 | Transfer the signal to the receiver side |
| 6 | Rectify and regulate the signal |
| 7 | Charge the device |
| 8 | Query the battery state: if battery not full then repeat step 3; else, go to step 9 |
| 9 | end |

Figure 4:
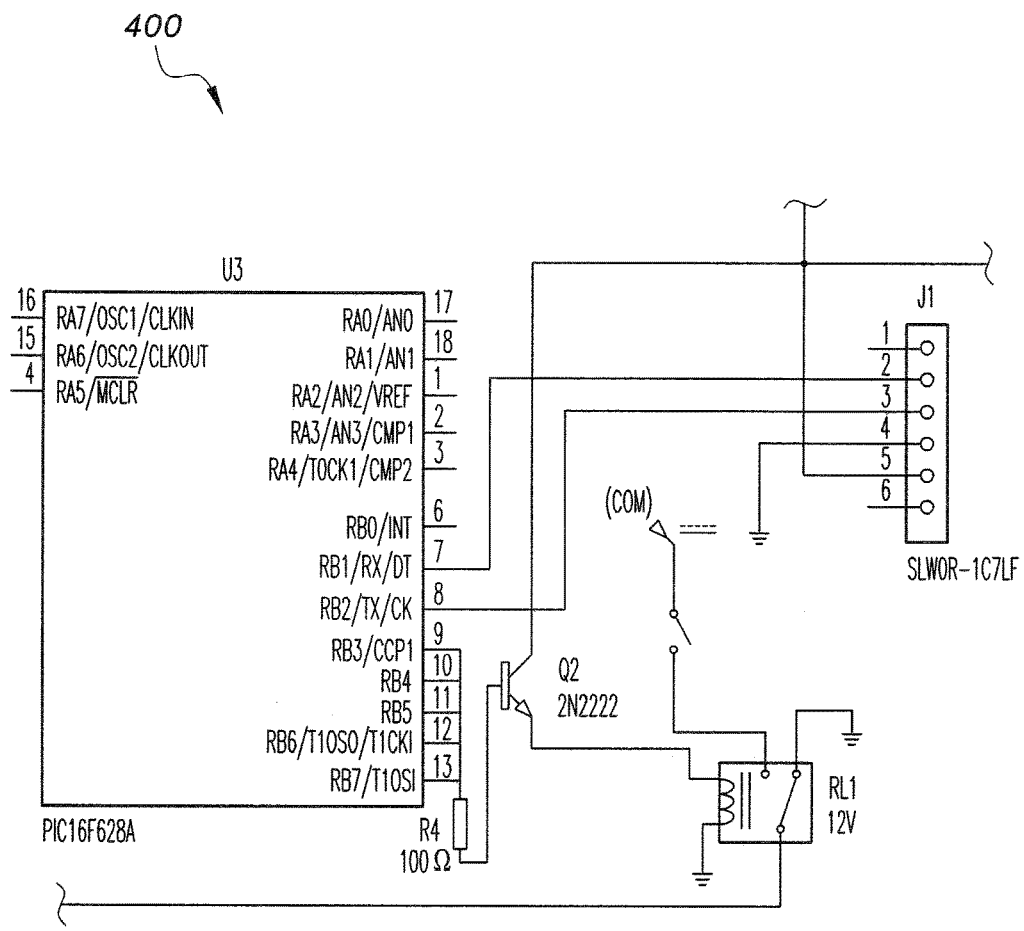
FIG. 4 is a schematic diagram of a PIC microcontroller circuit used in the transmitter of FIG. 1.

The transmitter and receiver should communicate with each other to start and stop transmitting power. As seen in FIGS. 1 and 4, there are different unlicensed wireless communication technologies (depicted in FIG. 1 as the wireless communication circuit "WCC") that can provide the means for transmitter and receiver communications with each other to start and stop transmitting power, such as BLUETOOTH ® (over IEEE 802.15.1) and Wi-Fi (over IEEE 802.11). BLUETOOTH ® was chosen in present prototype because of its low power consumption, and it provides the range needed (0-100 m). In addition to IEEE 802.15.1, 2, the portable wireless charging system may use ANSI Std. C95.1, which is involved when using the electromagnetic waves as means of energy transfer wirelessly.

The input of this system is a DC power source, which needs to be converted to AC power. This process is done by connecting an inverter (the op amp inverter U1) so the direct current will be oscillated and converted to alternating current at certain frequency, as required. In the oscillator's tank circuit, both capacitors (C2 and C3) are connected in series and act as a voltage divider. At the beginning, both capacitors C2 and C3 will start charging. When these capacitors are fully charged, they will start to discharge through the inductor L1, which is connected in parallel with them. The oscillations that are caused across the capacitors are directly connected to the input of the operational amplifier. The feedback amount that is fed to the amplifier is controlled according to the combination of the series capacitors, which can be calculated by equation (1) below. In this operation, the energy is transferred between the capacitors and the inductor as magnetic flux. After that, the energy stored in the inductor will be discharged and the capacitors will be charged again. This process will be repeated, and it represents the oscillation operation. The phase shift required is obtained by a positive feedback for sustained, undamped oscillation. Both capacitors provide a constant amount of feedback. This is done by adjusting one of them, and the other capacitor directly follows the adjusted one. The series combination of the capacitors, which is parallel with the inductor, provides 180° phase shift. This phase shift is inverted by 180° by using the amplifier to have 360° or 0°, which is the required oscillated output signal. In the prototype, C2=C3=1 nF, and L1=1 mH are used to have the frequency around 225 KHz by using the following relation:

$$f = \frac{1}{2\pi\sqrt{LC_b}} \text{ where } C_b = \frac{C_2 C_3}{C_2 + C_3}. \quad (1)$$

As stated before, the output of the oscillator is connected to a class C power amplifier. The MOSFETs and tuned circuits of the class C power amplifier provide switching time at one-half cycle, as demonstrated by the typical switching time for the IRF540; IRF540 MOSFETs, which provide the best combination of fast switching, ruggedized device design, low on-resistance, and low thermal resistance at the designed frequency. The tuned circuit is designed to match the oscillator frequency to have the best power transfer and amplification. The output frequency is equal to 212.76 KHz with peak-to-peak voltage ($V_{p-p}$) around 31 V. The resonant frequency is calculated as follows:

$$f = \frac{1}{4.7 \times 1 \times 10^{-6}} = 212.76 \text{ kHz}$$
$$V_{p-p} = 6.2 \times 5 = 31 \text{ V}.$$

Figure 5:
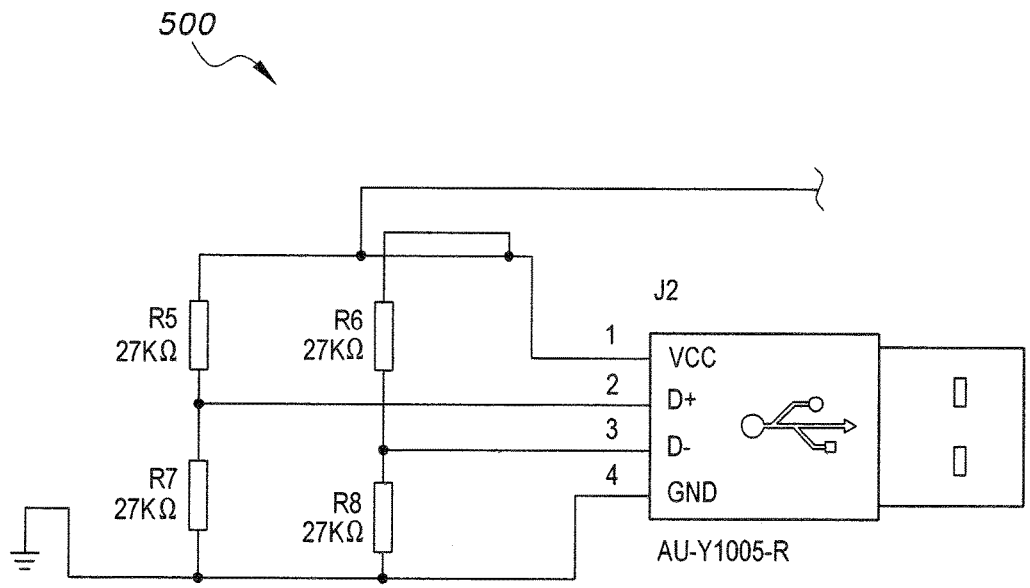
FIG. 5 is a schematic diagram of the USB port circuit used in the transmitter of FIG. 1.

BLUETOOTH ® was used as part of the controlling unit for the system. The PIC (Peripheral Interface Controller) microcontroller U3 asks the BLUETOOTH ® continuously whether it is paired or not, and checks the response from the BLUETOOTH ®. Once it is paired, the microcontroller sends 5V to a relay RL1 that is connected to ground by default, and switches it to the power source to start the system. To equip the user with more options to charge the mobile phone, a USB port circuit 500 (most clearly shown in FIG. 5) was added to the transmitter. Since the system cannot be connected to the mobile phone when its battery dies, so in this case, the USB port can be used to charge the mobile device.

The transmitter and receiver contain a primary coil 1800 and a secondary coil 1900 (see FIGS. 18 and 19), respectively, which are responsible to transfer the power from the transmitter to the receiver. These coils are used for low power circuits. At the receiver, the frequency range must be between 100 KHz to 210 KHz, based on the Qi standard. The inductance of the coils should be in the range of 6 µH to 27 µH, and the separation distance between the transmitter (Tx) primary coil and the receiver (Rx) secondary coil must be from 1-3 cm. The working DC supply voltage for the present device can go from 9 V to 11 V.

Both transmitter and receiver coils can be made ferromagnetic, i.e., a magnet can be placed in the center of the coils in order to increase the magnetic field strength. The dimension of the coils must be convenient to fit perfectly in both transmitter and receiver modules. These coils are flat and planar, and can be made as single layer or stacked layers. A ferrite sheet is used to provide a magnetic shield on one side, and its thickness is between 0.5-5 mm. Since the power is within 5 W, the sheet used is thin.

In the receiver, the induced AC power in the coil due to the electromagnetic field needs to be converted to DC power. This operation is done using the full-wave bridge rectifier 600. The signal in the positive half cycle is passed through diodes 2 and 3, which are forward-biased, while diodes 1 and 4 will be reverse-biased. In the negative half cycle, diodes 1 and 4 are forward-biased, while diodes 2 and 3 will be reverse-biased, so the negative part of the signal is rectified, and the output is a DC voltage, as required. In order to get a fixed output voltage, a smoothing capacitor needs to be added after the rectifier; so that it will be charged when the signal is raised up and then discharged when the signal drops from the peek voltage. In this device, C1=220 µF is used because the range is between 100 µF to 220 µF for the smoothing capacitor at high frequency.

The 7805 regulator 700 gives a fixed output voltage of 5V. Pin 1 is connected to the unregulated DC input voltage. Pin 2 is connected to ground, and pin 3 is the output of the regulator at 5V.

In the prototype, the transmitter has two transmitting primary coils. Each receiver (there are two receivers) has its own receiving secondary coil. The oscillating signal from the oscillator circuit 200 is amplified by two power amplifiers, configured in parallel. Each power amplifier is dedicated to a corresponding receiver. On the receiver side, the signal is magnetically coupled by the receiving secondary coil of each receiver in which induced oscillatory currents will be induced in each receiving coil. Then, the AC signal is converted to DC using the full-wave bridge rectifier 600. As a result, in the prototype, the output DC voltage from the rectifier was 7.7 V, after which the rectified signal is regulated to 5 V. Once the signal is regulated in the receiver side, each receiver is connected to a mobile device in three different scenarios in order to test the robustness of the system.

The first scenario was when receiver 1 is connected and receiver 2 is disconnected. Current was 441 mA to the mobile device, and the voltage across it was 4.6 V. The second way was when receiver 1 is disconnected and receiver 2 is connected. The output is almost the same as the first way. The current was 454 mA, and the voltage was 4.5 V. The third scenario was when both receivers are connected. The output current decreased to 353 mA and 326 mA in both receivers, and the voltage remained almost the same. The mobile devices were charged whenever they were connected to the receiver.

Figure 8:
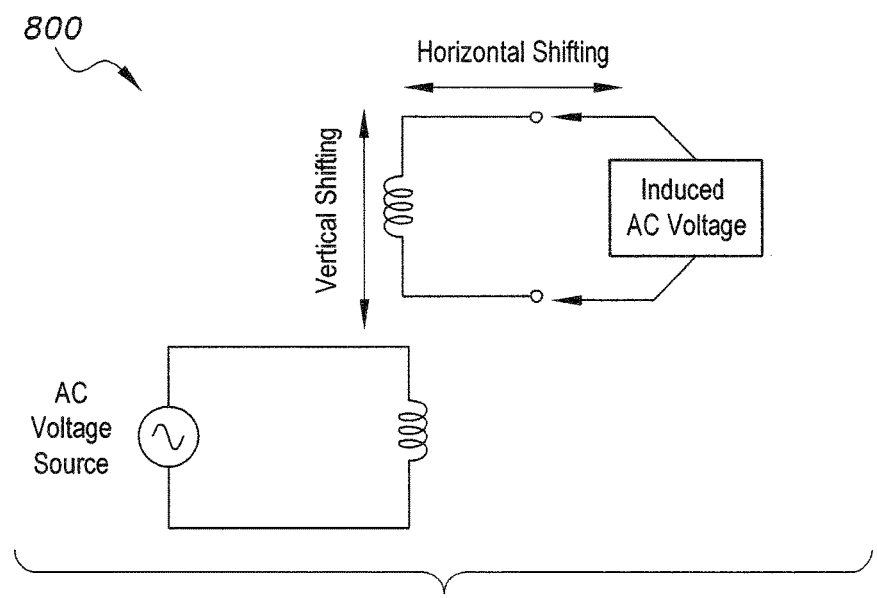
FIG. 8 is a schematic diagram showing positional testing of the primary and secondary coils of the transmitter and receiver of the multi-element portable wireless charging device according to the present invention.

During the implementation, the developed voltage after the rectifier circuit was measured with an input of 11 DC supply voltage to the transmitter in three different configurations. The first and second setups were to shift the coils vertically and horizontally at a fixed oscillating frequency, which is 225 KHz. The third way was to change the distance vertically and horizontally at the same time between both coils. Table 2 shows the values of current and voltage while changing the vertical distance in the test setup 800 (shown in FIG. 8).

TABLE 2

Vertical Distance Step

| Distance (cm) - vertical | Current (mA) | Voltage (v) |
|---|---|---|
| 0.25 | 390 | 4.68 |
| 0.5 | 300 | 4.6 |
| 1 | 120 | 4.2 |
| 1.5 | 30 | 3.9 |

Figure 9:
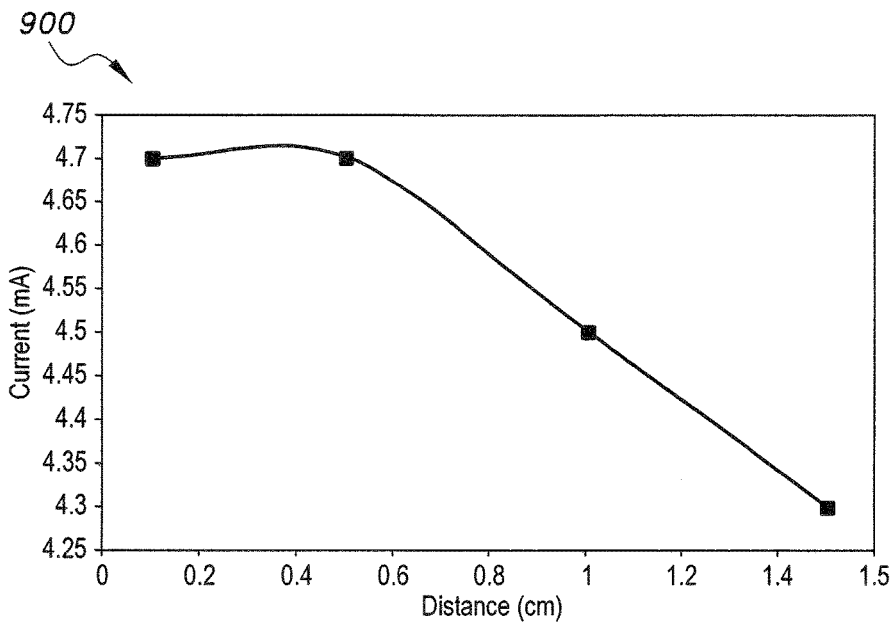
FIG. 9 is a plot showing horizontal distance between the primary and secondary coils versus voltage at 11 volts peak and a frequency of 225 kHz.
Figure 10:
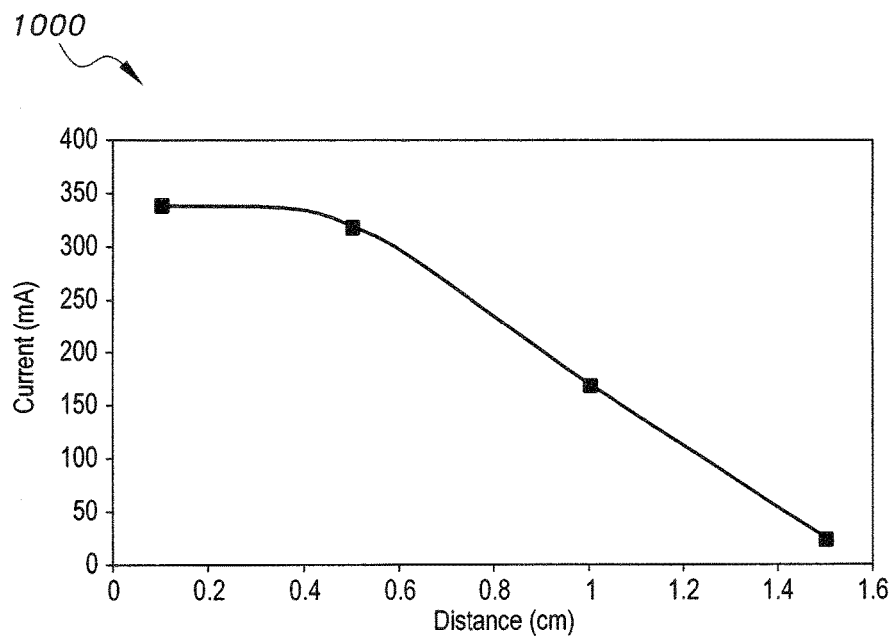
FIG. 10 is a plot showing horizontal distance between the primary and secondary coils versus current at 11 volts peak and a frequency of 225 kHz.
Figure 11:
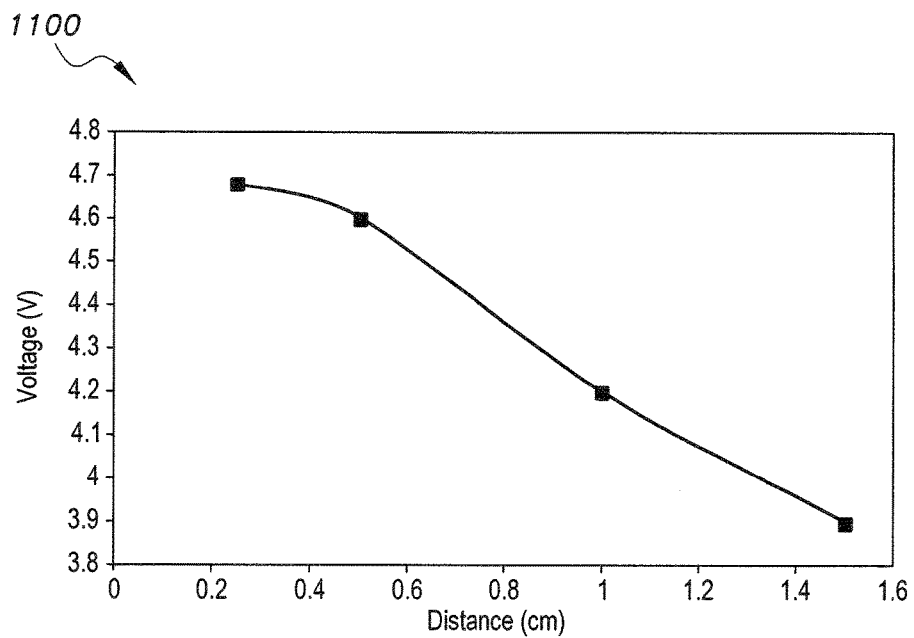
FIG. 11 is a plot showing vertical distance between the primary and secondary coils versus voltage at 11 volts peak and a frequency of 225 kHz.
Figure 12:
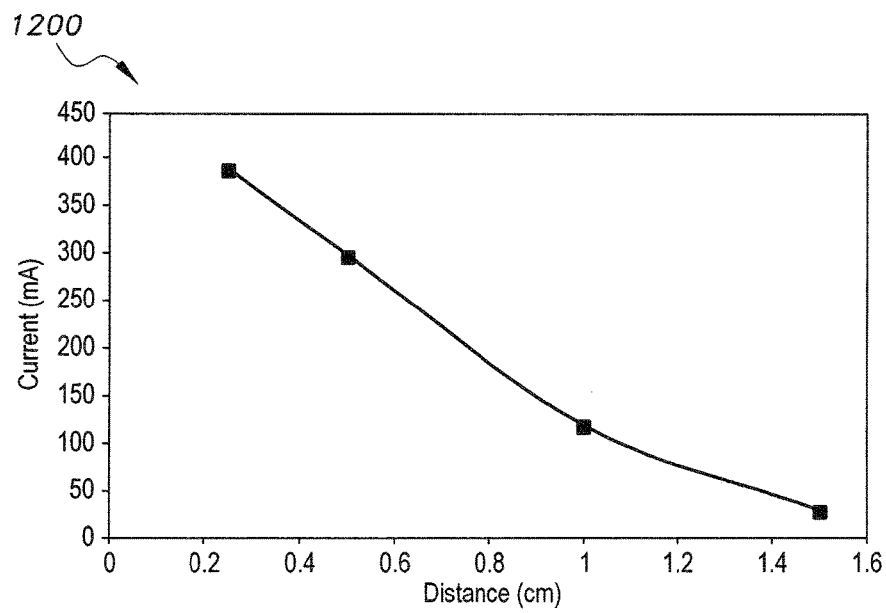
FIG. 12 is a plot showing vertical distance between the primary and secondary coils versus current at 11 volts peak and a frequency of 225 kHz.
Figure 13:
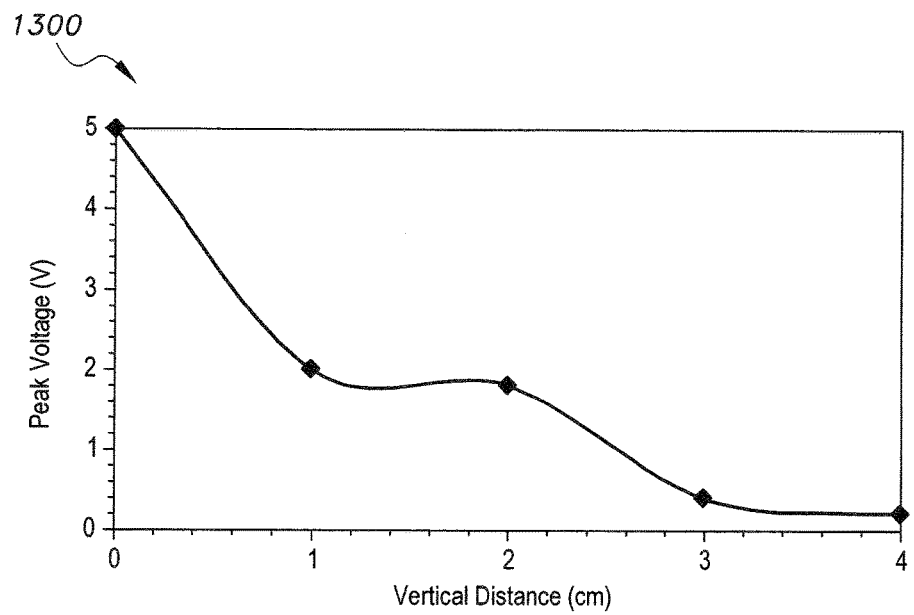
FIG. 13 is a plot showing vertical distance between the primary and secondary coils versus voltage at 5 volts peak and a frequency of 5 MHz.
Figure 14:
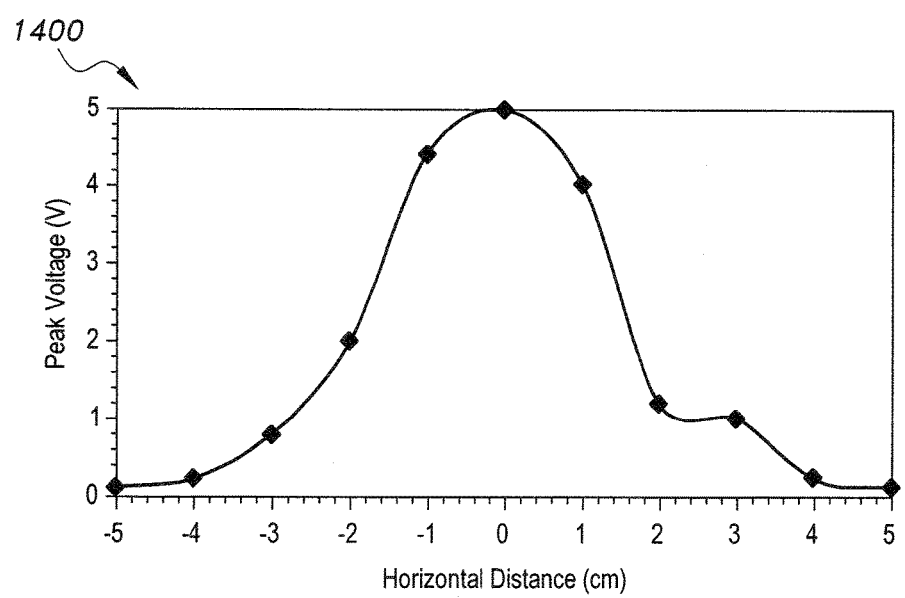
FIG. 14 is a plot showing horizontal distance between the primary and secondary coils versus voltage at 5 volts peak and a frequency of 5 MHz.
Figure 15:
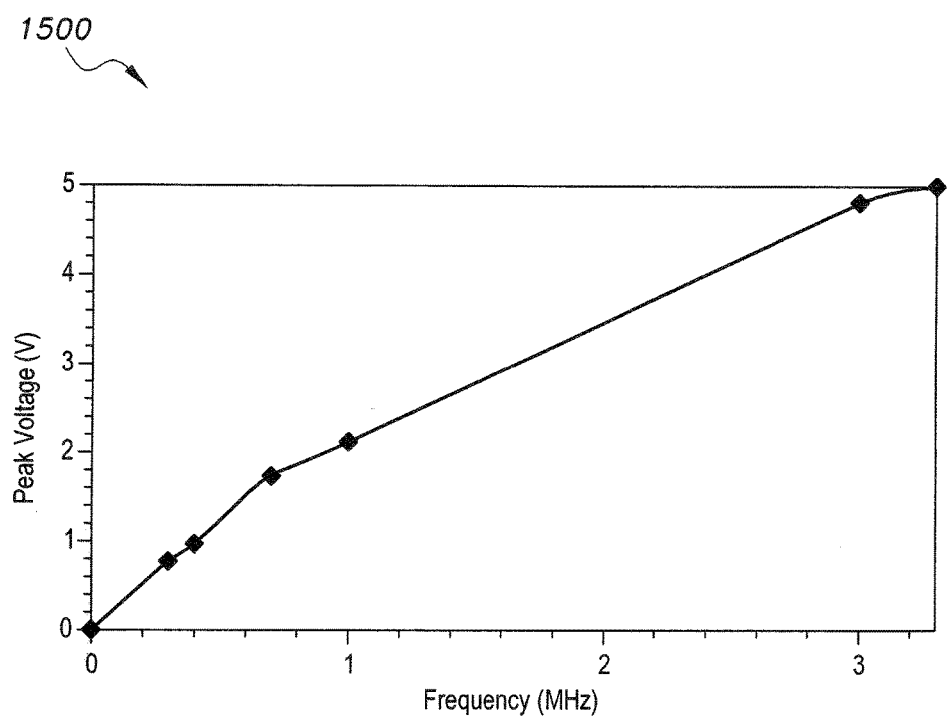
FIG. 15 is a plot showing frequency versus voltage induced in the secondary coil.

Table 2 and graphs of the vertical distance test show that the output power drops severely after the vertical distance between the transmitter and receiver coils exceeds 1.1 cm, so it can be inferred that the magnetic coupling between the coils is good only for short distances. Although not shown here, the use of magnets as a core of the coils will overcome the aforementioned distance limitation. Plot 900 of FIG. 9 illustrates the voltage drop-off as the receiving unit is moved horizontally away from the transmitting unit. Plot 1000 of FIG. 10 illustrates the current drop-off as the receiving unit is moved horizontally away from the transmitting unit. Plot 1100 of FIG. 11 illustrates the voltage drop-off as the receiving unit is moved vertically away from the transmitting unit. Plot 1200 of FIG. 12 illustrates the current drop-off as the receiving unit is moved vertically away from the transmitting unit. Plot 1300 of FIG. 13 illustrates the peak voltage drop-off as the receiving unit is moved vertically away from the transmitting unit at 5 volts peak and a frequency of 5 MHz. Plot 1400 of FIG. 14 illustrates the peak voltage drop-off as the receiving unit is moved horizontally away from the transmitting unit at 5 volts peak and a frequency of 5 MHz. Plot 1500 of FIG. 15 illustrates how the peak voltage changes as the transmitter oscillator frequency is increased.

Figure 16:
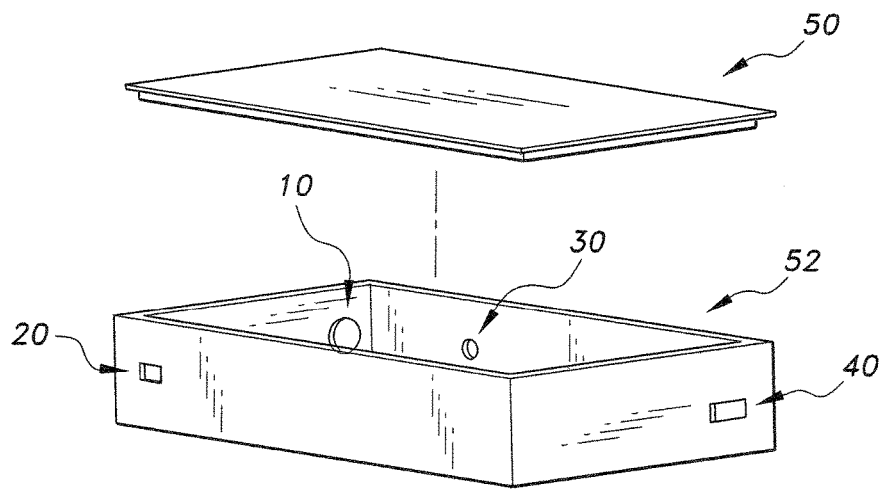
FIG. 16 is an exploded, perspective view of the transmitter prototype casing and cover for a multi-element portable wireless charging device according to the present invention.
Figure 17:
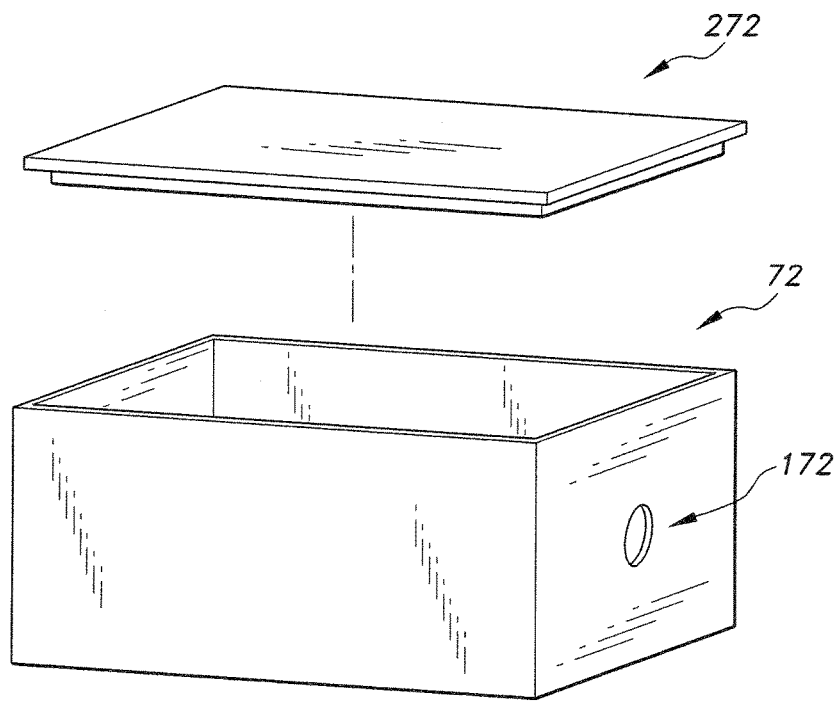
FIG. 17 is an exploded, perspective view of the receiver prototype casing and cover for a multi-element portable wireless charging device according to the present invention.

As shown in FIG. 16, the transmitter prototype includes a transmitter housing 52, a cover 50, a recharging port 10, an On-Off switch port 20, a Pair LED port 30, and a USB charger output port 40. As shown in FIG. 17, the receiver prototype includes a receiver housing 72, a USB charger output port 172, and a receiver cover 272.

In the design of the transmitter case, the width is 9 cm, height 3 cm and the length is 20 cm. The transmitter case contains the transmitting circuit, transmitter primary coils, Bluetooth circuit, and the microcontroller circuit. In the design of the receiver, both the width and the length are 4.2 cm and the height is 2.5 cm. Each receiver case contains a secondary coil, the rectifier circuit, and the regulator circuit.

Figure 18:
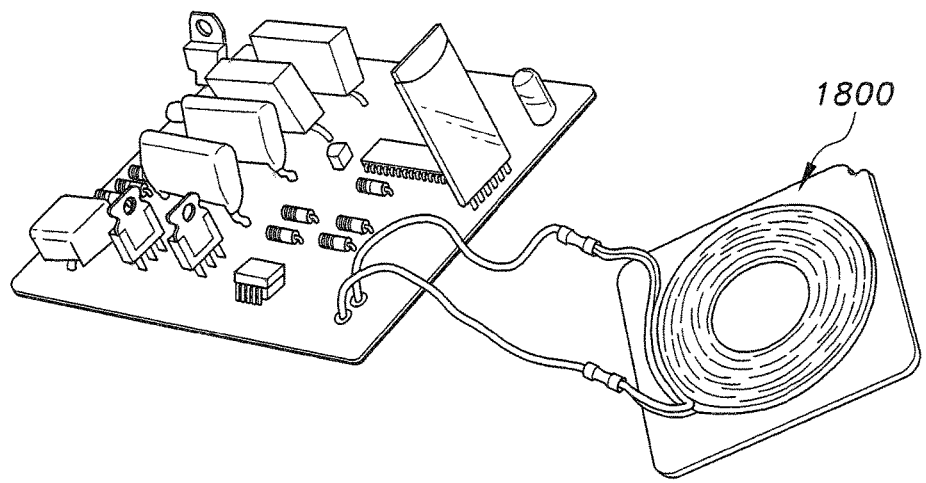
FIG. 18 is a perspective view of the transmitter printed-circuit board and primary coil of a portable wireless charging system according to the present invention.
Figure 19:
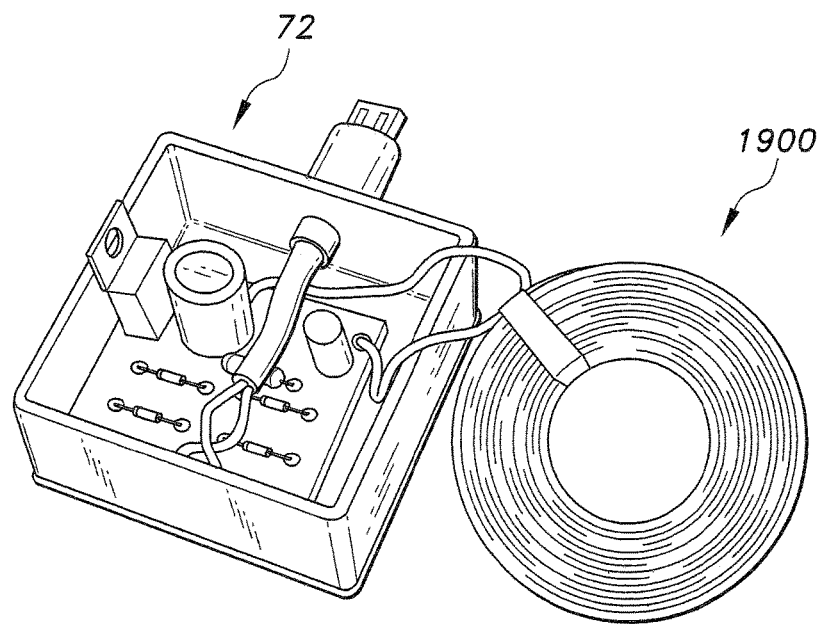
FIG. 19 is a perspective view of the receiver printed-circuit board and secondary coil of a portable wireless charging system according to the present invention.

A printed-circuit board (PCB) was used after verifying that the system is working as the tested circuit. A double-layer PCB was used to minimize the size of the system. The prototypes of the transmitter and receiver in PCB technology are shown in FIGS. 18 and 19.

It is to be understood that the present invention is not limited to the embodiments described above, but encompasses any and all embodiments within the scope of the following claims.

We claim:

1. A multi-element portable wireless charging device, comprising:
    a DC power source;
    an RF oscillator circuit connected to the DC power source, the oscillator circuit having an oscillating output signal, wherein the RF oscillator circuit comprises a Colpitts oscillator;
    a power amplifier circuit having an input connected to the oscillating output signal of the RF oscillator circuit and an output having a tuned circuit maintaining the power amplifier output at a frequency between 100 kHz and 210 kHz, wherein the power amplifier circuit comprises a class C amplifier circuit;
    at least one flat, planar primary coil connected to the output of the amplifier circuit, the DC power source, the RF oscillator circuit, the power amplifier circuit, and the primary coil forming a transmitter;
    a USB charging port circuit connected to the transmitter;
    at least one receiver having:
        a flat, planar secondary coil;
        a full-wave bridge rectifier circuit connected to the secondary coil for rectifying an alternating current signal induced in the secondary coil; and
        a voltage regulator circuit connected to the rectifier circuit for producing a regulated 5 V output, the output of the voltage regulator circuit being adapted for connection to a battery charging circuit of a mobile device in need of battery charging;
    a wireless communications circuit connected to a PIC microcontroller circuit, the wireless communications circuit being adapted for establishing communications with the mobile device in need of battery charging, the PIC microcontroller being configured for signaling a relay switch to close and apply power to the RF oscillator circuit when a battery of the mobile device needs charging and for signaling the relay switch to open and disconnect power from the RF oscillator circuit when the battery of the mobile device has completed charging,
    wherein power is transferred from the transmitter to the receiver by magnetic inductive coupling between the at least one primary coil and the secondary coil of the at least one receiver.

2. The multi-element portable wireless charging device according to claim 1, wherein said DC power source comprises a fully charged battery, whereby the transmitter is portable.

3. The multi-element portable wireless charging device according to claim 1, wherein said oscillator circuit comprises an inverting operational amplifier and an LC tank circuit providing feedback to the operational amplifier.

4. The multi-element portable wireless charging device according to claim 1, wherein said USB charging port circuit is adapted for receiving a USB cable connected to the mobile device and applying a charging voltage through the cable when the battery of the mobile device is too depleted to maintain wireless communications through the wireless communications circuit.

5. The multi-element portable wireless charging device according to claim 1, wherein said at least one receiver is dimensioned and configured for installation within the mobile device in need of battery charging.

6. The multi-element portable wireless charging device according to claim 1, wherein:
- said power amplifier circuit comprises two power amplifiers connected in parallel;
- said at least one primary coil comprises two primary coils, each of the primary coils being connected to the output of a corresponding one of the power amplifiers; and
- said at least one receiver comprises two receivers;
- whereby the system is capable of charging batteries in two mobile devices simultaneously.

7. The multi-element portable wireless charging device according to claim 1, further comprising:
- a low-weight magnet attached to the center of said at least one primary coil; and
- a second magnet attached to the center of said secondary coil.

8. The multi-element portable wireless charging device according to claim 1, wherein two receivers are oriented on the transmitter's pad in any direction and more than two flat coils are overlapped within a housing of the transmitter.

9. A method of using the multi-element portable wireless charging device according to claim 1 to charge a battery in a mobile device, comprising the step of aligning the at least one primary coil with the secondary coil of the at least one receiver horizontally and vertically so that the coils are separated by a gap between 1 cm and 3 cm in order to ensure power transmission from the transmitter to the at least one receiver by magnetic inductive coupling.

* * * * *